United States Patent [19]
Goeke et al.

[11] Patent Number: 5,875,620
[45] Date of Patent: Mar. 2, 1999

[54] LAWNMOWER BLOWER APPARATUS

[76] Inventors: William John Goeke; Tammy Marie Van Landeghem, both of 965 Dammert, St. Louis, Mo. 63125

[21] Appl. No.: 744,058

[22] Filed: Nov. 5, 1996

[51] Int. Cl.⁶ .............................. A01D 87/10; A01D 34/70
[52] U.S. Cl. ................................. 56/13.4; 56/16.6; 56/202
[58] Field of Search ..................................... 56/13.3, 13.4, 56/16.9, 16.6, 202, 203

[56] References Cited

U.S. PATENT DOCUMENTS

| | | | |
|---|---|---|---|
| 3,464,191 | 9/1969 | Copley et al. | 56/16.6 X |
| 3,987,606 | 10/1976 | Evans | 56/13.3 X |
| 4,054,023 | 10/1977 | Carpenter . | |
| 4,095,398 | 6/1978 | Aumann et al. | 56/13.4 X |
| 4,488,395 | 12/1984 | Mack | 56/13.4 |
| 4,711,253 | 12/1987 | Anderson | 56/13.3 X |
| 4,996,829 | 3/1991 | Saitoh et al. . | |
| 5,042,241 | 8/1991 | Boylston et al. . | |
| 5,125,222 | 6/1992 | Speier . | |
| 5,179,824 | 1/1993 | Ridge et al. . | |
| 5,365,727 | 11/1994 | Cross . | |

*Primary Examiner*—Heather Shackelford

[57] ABSTRACT

A blower apparatus, which is used with a lawnmower which has an engine and a cutting blade housing, includes a blower assembly supported by the lawnmower. The blower assembly is located distal to the cutting blade housing and is powered by the lawnmower engine. A transport conduit has a transport-conduit input end and a transport-conduit output end which is connected to the cutting blade housing. A pressurized blower conduit has a blower-conduit input end and a blower-conduit output end which is connected to the blower assembly. The blower-conduit output end is connected to the transport conduit at an intermediate position between the transport-conduit input end and the transport-conduit output end. A top loading container assembly is supported by the lawnmower, and the top loading container assembly is connected to the transport-conduit output end. The blower-conduit output end is connected to the intermediate position of the transport conduit at an acute connection angle between the transport conduit and the blower-conduit output end. The blower assembly includes an impeller connected to the engine. A blower housing is supported by the lawnmower and houses the impeller. The blower-conduit input end is connected to the blower housing, and the blower housing includes a plurality of air inlets. The top loading container assembly includes a container, a container-support bracket which supports the container, fasteners for connecting the container-support bracket to the lawnmower, and a cover assembly supported by the container.

4 Claims, 3 Drawing Sheets

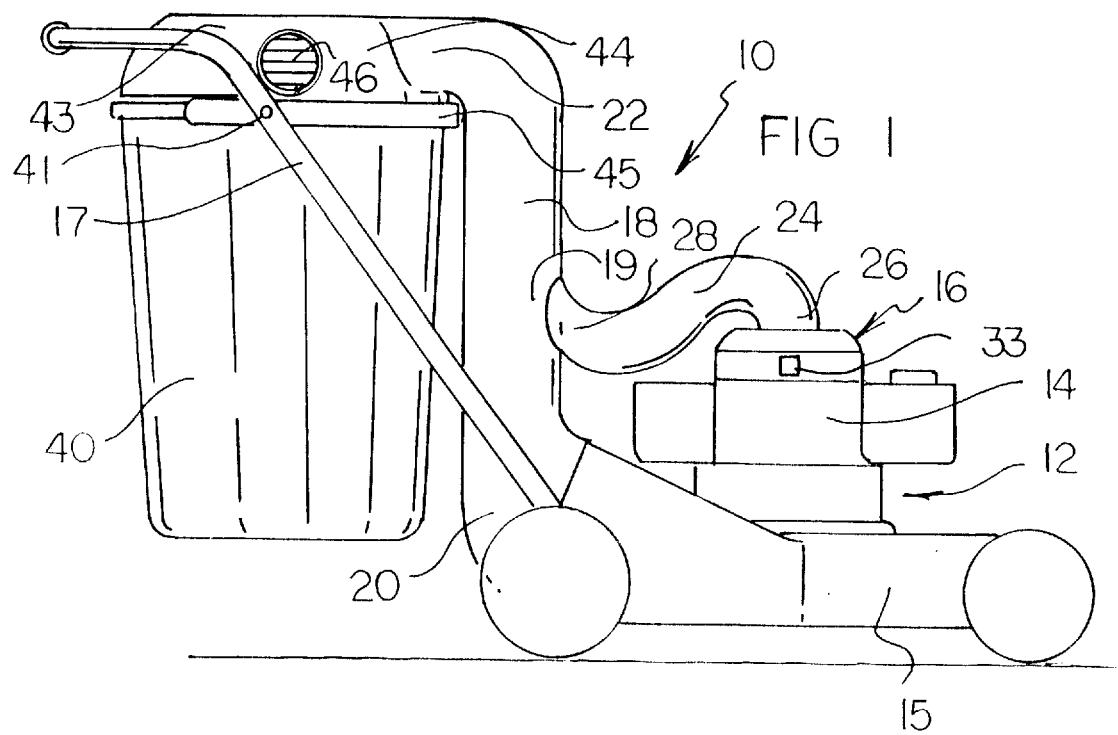
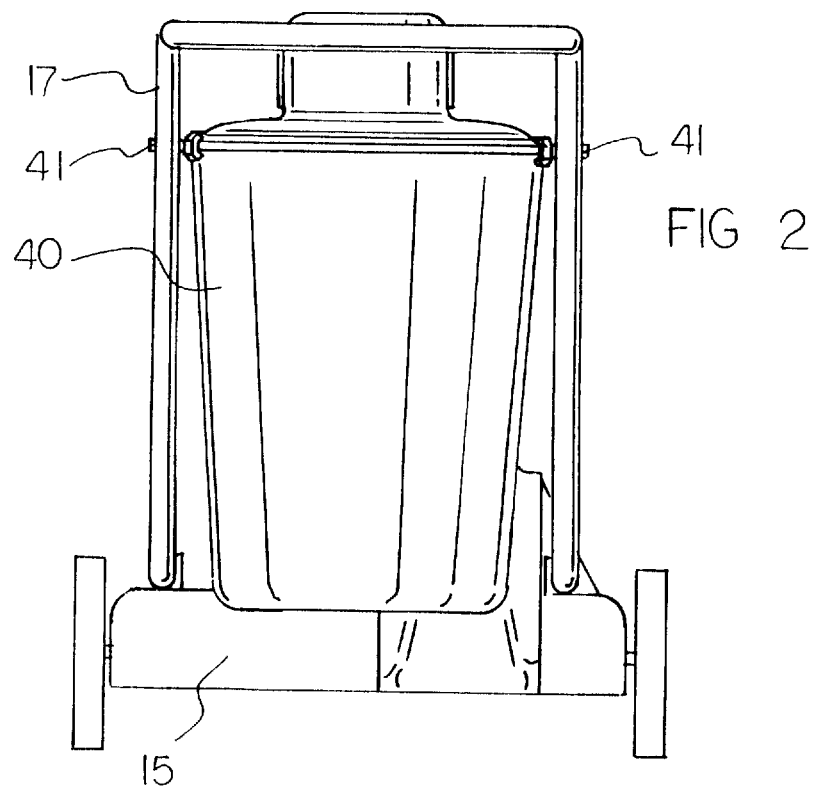

LAWNMOWER BLOWER APPARATUS

BACKGROUND OF THE INVENTION

1. Field of the Invention

The present invention relates generally to power lawnmowers and, more particularly, to power lawnmowers that have provisions for collecting lawn cuttings.

2. Description of the Prior Art

When lawns are cut, sometimes the cuttings are left on the lawns where they are recycled naturally. At other times, the cuttings are collected to be disposed of or to be recycled elsewhere. A number of ways are available for collecting lawn cuttings. The simplest is to rake up the cuttings. This way is simple, yet very time consuming and requires a great amount of extra work. Another approach for collecting cuttings is to have a collection container associated with lawnmower. In this respect, throughout the years, a number of innovations have been developed relating to lawnmowers that have associated containers for the collection of lawn cuttings, and the following U.S. Pat. Nos. are representative of some of those innovations: 4,054,023, 4,996,829, 5,042,241, 5,125,222, 5,179,824, and 5,365,727. More specifically, U.S. Pat. No. 4,054,023 discloses a riding lawnmower that has a vertically oriented, top loading collection container. The collection container receives cuttings through a conduit which extends from the collection container to the housing which houses the cutting blade. The motion of the cutting blade creates the energy to lift the cuttings and a stream of carrier air from the lower level of the cutting blade housing to the elevated level of the top of the collection container. During use of this lawnmower, the cutting blade housing may become clogged with lawn cuttings. This is especially true when the lawn is especially long. Such a clogging of the cutting blade housing can impede reduce the lifting power and impede the flow of cuttings from the cutting blade housing to the collection container. To avoid the effects of clogging of the cutting blade housing on the transport of cuttings to the collection container, it would be desirable if a device for collecting lawn cuttings did not depend upon lifting pressure developed in a cutting blade housing.

U.S. Pat. No. 4,996,829 discloses a lawnmower that has a blower and blower housing that are contained in the cutting blade housing and that are in close proximity to the cutting blade. As a result, cuttings that are not readily lifted by the blower can readily clog the blower. Moreover, the presence of the blower and the blower housing in the cutting blade housing can detract from optimum performance of the cutting blade. Preferably, a cutting blade housing should be designed for optimum performance of a cutting blade without consideration of a blower or blower housing. In this respect, it would be desirable if a lawnmower cutting collection device were provided which has a blower and blower housing which are not contained in a cutting blade housing.

Each of U.S. Pat. Nos. 5,042,241, 5,125,222, 5,179,824, and 5,365,727 discloses a lawnmower that has a bag for collection of cuttings wherein the collection bag is oriented substantially horizontally so that the opening for the collection bag is not located vertically above the bottom of the collection bag. As a result, the opening of the collection bag has a tendency to clog with cuttings. As disclosed in U.S. Pat. Nos. 4,054,023 and 4,996,829, a vertically oriented collection container that receives cuttings through a container opening that is oriented vertically above the bottom of the container provides for an efficient mode of cutting collection. With such a collection container, the pull of gravity helps cuttings clear the container opening thereby helping to prevent clogging of the container opening. In this respect, it would be desirable if a lawnmower cutting collection device were provided which has a collection opening that is oriented vertically above the bottom of a collection container.

A blower device has input air supply and an air output. With the air blowers disclosed in each of U.S. Pat. Nos. 4,054,023 and 4,996,829, the input air supply is laden with lawn cuttings. Burdening the input air supply with cuttings reduces the efficiency and lifting power of the blower. In this respect, it would be desirable if a lawnmower cutting collection device were provided with a blower that has an input air supply that is free of lawn cuttings.

With each of U.S. Pat. Nos. 4,054,023 and 4,996,829, lawn cuttings are pushed from the cutting blade housing to a collection container. The pushing effect contributes to the tendency of the cuttings to clog the transport conduit to the collection container. In this respect, it would be desirable if a lawnmower cutting collection device were provided which pulls lawn cuttings from the cutting blade housing.

Thus, while the foregoing body of prior art indicates it to be well known to use blower-containing devices for collecting lawn cuttings, the prior art described above does not teach or suggest a lawnmower blower apparatus which has the following combination of desirable features: (1) does not depend upon lifting pressure developed in a cutting blade housing for transporting cuttings; (2) has a blower and blower housing which are not contained in a cutting blade housing; (3) has a collection opening that is oriented vertically above the bottom of a collection container; (4) provides a blower that has an input air supply that is free of lawn cuttings; and (5) pulls lawn cuttings from the cutting blade housing. The foregoing desired characteristics are provided by the unique lawnmower blower apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a blower apparatus, which is used with a lawnmower which has an engine and a cutting blade housing. The blower apparatus includes a blower assembly supported by the lawnmower. The blower assembly is located distal to the cutting blade housing and is powered by the lawnmower engine. A transport conduit has a transport-conduit input end and a transport-conduit output end, and the transport-conduit input end is connected to the cutting blade housing. A pressurized blower conduit has a blower-conduit input end and a blower-conduit output end, and the blower-conduit input end is connected to the blower assembly. The blower-conduit output end is connected to the transport conduit at an intermediate position between the transport-conduit input end and the transport-conduit output end. A top loading container assembly is supported by the lawnmower, and the top loading container assembly is connected to the transport-conduit output end.

The blower-conduit output end is connected to the intermediate position of the transport conduit at an acute connection angle between the transport conduit and the blower-conduit output end. The blower assembly includes an impeller connected to the engine. A blower housing is supported by the lawnmower and houses the impeller. The blower-conduit input end is connected to the blower housing, and the blower housing includes a plurality of air inlets.

The top loading container assembly includes a container, a container-support bracket which supports the container, fasteners for connecting the container-support bracket to the lawnmower, and a cover assembly supported by the container.

The cover assembly includes a cover and a conduit connector portion connected to the cover. The conduit connector portion is connected to the transport-conduit output end, and a vent portion is connected to the cover. The cover, the transport conduit, and the pressurized blower conduit are formed as a unified, integrated structure.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lawnmower blower apparatus which has all of the advantages of the prior art and none of the disadvantages.

It is another object of the present invention to provide a new and improved lawnmower blower apparatus which may be easily and efficiently manufactured and marketed.

It is a further object of the present invention to provide a new and improved lawnmower blower apparatus which is of durable and reliable construction.

An even further object of the present invention is to provide a new and improved lawnmower blower apparatus which is susceptible of a low cost of manufacture with regard to both materials and labor, and which accordingly is then susceptible of low prices of sale to the consuming public, thereby making such lawnmower blower apparatus available to the buying public.

Still yet a further object of the present invention is to provide a new and improved lawnmower blower apparatus which does not depend upon lifting pressure developed in a cutting blade housing for transporting cuttings.

Still another object of the present invention is to provide a new and improved lawnmower blower apparatus that has a blower and blower housing which are not contained in a cutting blade housing.

Yet another object of the present invention is to provide a new and improved lawnmower blower apparatus which has a collection opening that is oriented vertically above the bottom of a collection container.

Even another object of the present invention is to provide a new and improved lawnmower blower apparatus that provides a blower that has an input air supply that is free of lawn cuttings.

Still a further object of the present invention is to provide a new and improved lawnmower blower apparatus which pulls lawn cuttings from the cutting blade housing.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a preferred embodiment of the lawnmower blower apparatus of the invention in use with a collection container.

FIG. 2 is a front view of the embodiment of the lawnmower blower apparatus shown in FIG. 1.

DESCRIPTION OF THE PREFERRED EMBODIMENT

Figure 3:
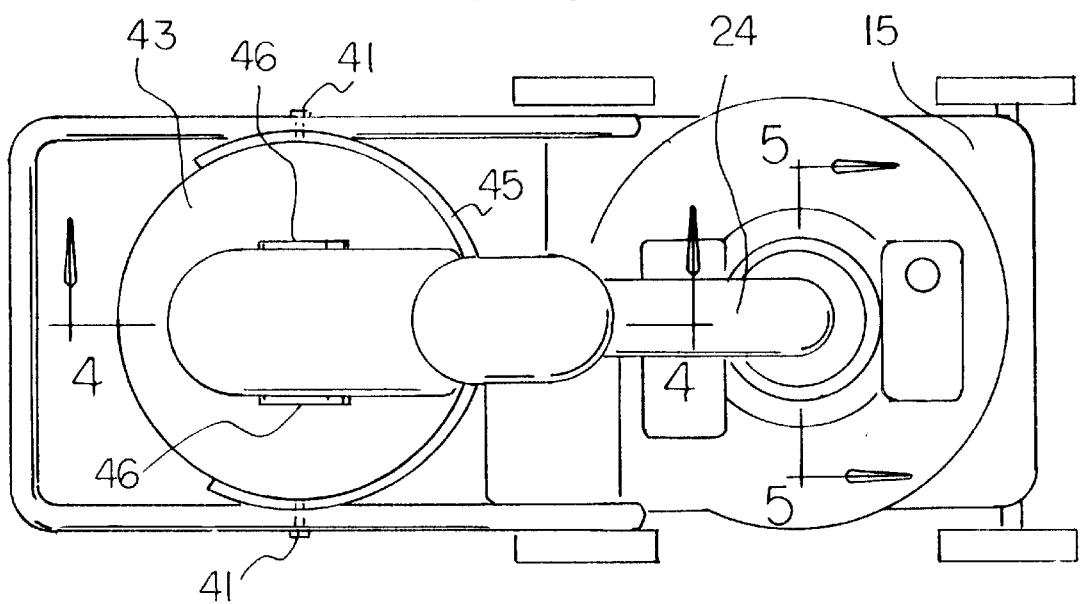
FIG. 3 is a top view of the embodiment of the lawnmower blower apparatus of FIG. 1.

With reference to the drawings, a new and improved lawnmower blower apparatus embodying the principles and concepts of the present invention will be described.

Turning to FIGS. 1–6, there is shown an exemplary embodiment of the lawnmower blower apparatus of the invention generally designated by reference numeral 10. In its preferred form, lawnmower blower apparatus 10, which is used with a lawnmower 12 which has an engine 14 and a cutting blade housing 15, includes a blower assembly 16, supported by the lawnmower 12. The blower assembly 16 is located distal to the cutting blade housing 15 and is powered by the lawnmower engine 14. A transport conduit 18 has a transport-conduit input end 20 and a transport-conduit output end 22, and the transport-conduit input end 20 is connected to the cutting blade housing 15. A pressurized blower conduit 24 has a blower-conduit input end 26 and a blower-conduit output end 28, and the blower-conduit input end 26 is connected to the blower assembly 16. The blower-conduit output end 28 is connected to the transport conduit 18 at an intermediate position 19 between the transport-conduit input end 20 and the transport-conduit output end 22. A top loading container assembly is supported by the lawnmower 12, and the top loading container assembly is connected to the transport-conduit output end 22. More specifically, the top loading container assembly is supported by the handle assembly 17 of the lawnmower 12.

The blower-conduit output end 28 is connected to the intermediate position 19 of the transport conduit 18 at an acute connection angle 21 between the transport conduit 18 and the blower-conduit output end 28. The blower assembly 16 includes an impeller 30 connected to the engine 14. A blower housing 32 is supported by the lawnmower 12 and houses the impeller 30. The blower-conduit input end 26 is connected to the blower housing 32, and the blower housing 32 includes a single air inlet 33 as shown in FIG. 1. In addition to providing an input passage for the flow of outside air through blower housing 32, the inlet 33 preferably is suitably arranged to receive the removable nozzle of a conventional auxiliary vacuum hose (not shown) so that the hose selectively may be attached to the housing via inlet 33 and used to collect debris (leaves, grass cuttings, etc.) at locations remote from the blower housing or locations which cannot be reached by the cutting blade housing 15.

Figure 5:
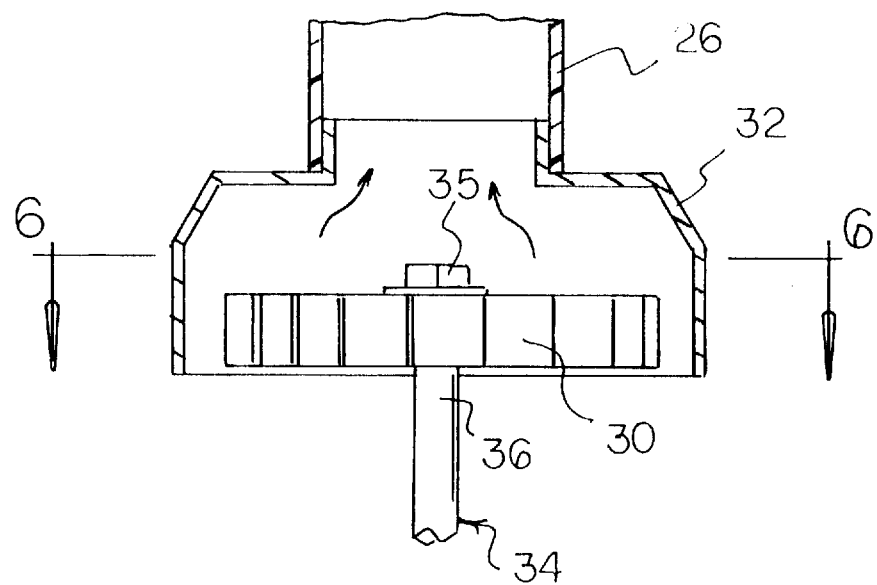
FIG. 5 is an enlarged, partial cross-sectional view of the embodiment of the invention shown in FIG. 3 taken along line 5—5 thereof.
Figure 6:
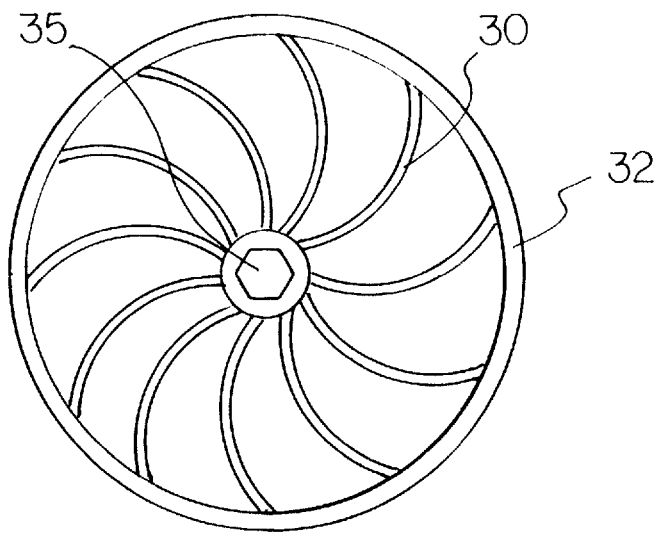
FIG. 6 is a cross-sectional view of the embodiment of the invention shown in FIG. 5 taken along line 6—6 thereof.

As shown in FIG. 5, the engine 14 has an output shaft 34 which has a top output shaft end 36 which is located distal to the cutting blade housing 15 and a bottom output shaft end (not shown) which supports a cutting blade (also not shown). A lock nut 35 is used to secure the impeller 30 to the top output shaft end 36 of the output shaft 34.

With the blower-conduit output end 28 being connected to the transport conduit 18 at the acute connection angle 21, when blown air from the pressurized blower conduit 24 enters the transport conduit 18, a partial vacuum is created in the portion of the transport conduit 18 between the intermediate position 19 and the transport-conduit input end 20. As a result, a suction is created in the transport conduit 18 for lifting lawn cuttings from the cutting blade housing 15 into the transport conduit 18. Once the lifted cuttings reach the intermediate position 19 in the transport conduit 18, the cuttings are then blown through the remainder of the transport conduit 18 to the top loading container assembly by the pressurized air generated by the blower assembly 16. The top loading container assembly includes a container 40, a container-support bracket 45 which supports the container 40, fasteners 41 for connecting the container-support bracket 45 to the lawnmower 12, and a cover assembly supported by the container 40. The container-support bracket 45 is supported by bolts 41 by the handle assembly 17 of the lawnmower 12. Preferably, container 40 is a conventional "garbage can" or trash receptacle fabricated of molded plastic material and readily commercially available from a hardware store such as Home Depot, for example. Thus, when the mowing operation is completed, the container 40 may be removed from the lawn mower 12, have its normal conventional top lid placed thereon, and situated at curbside or the like for pick-up by the local sanitation department or other trash removal agency.

Figure 4:
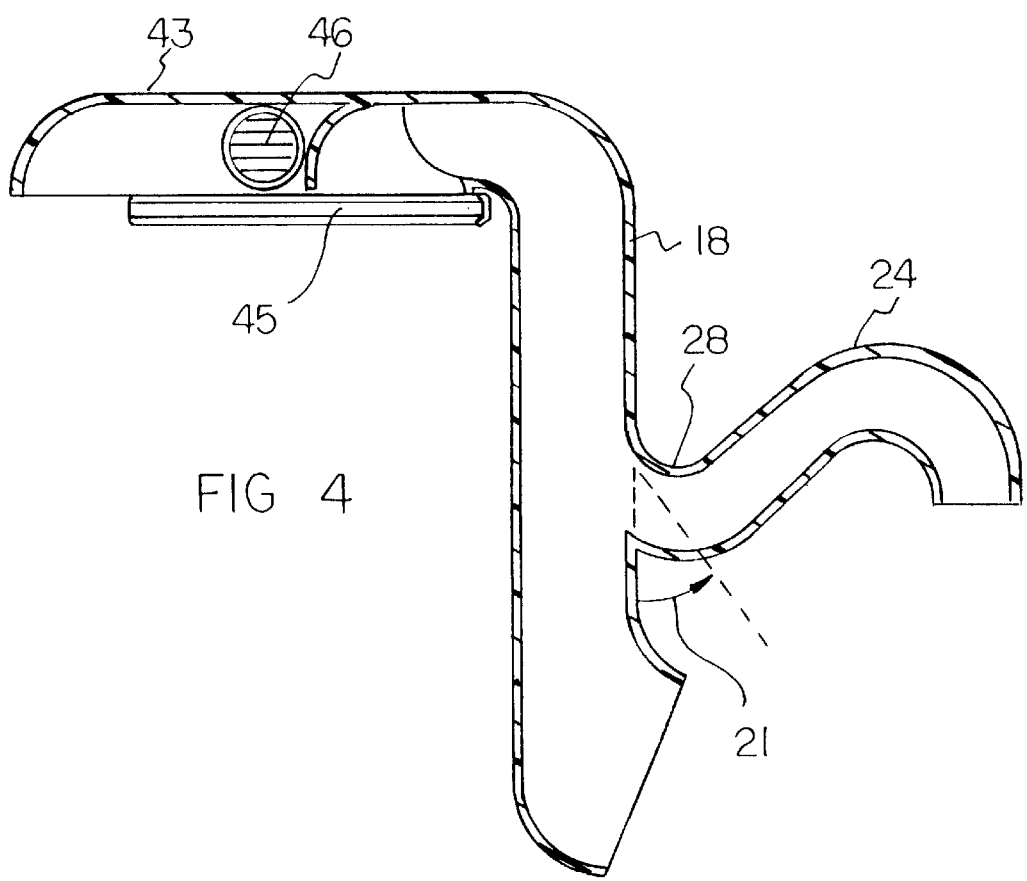
FIG. 4 is an enlarged, partial cross-sectional view of the embodiment of the invention shown in FIG. 3 taken along line 4—4 thereof.

The cover assembly includes a cover 43 and a conduit connector portion 44 connected to the cover 43. The conduit connector portion 44 is connected to the transport-conduit output end 22, and a vent portion 46 is connected to the cover 43. As shown in FIG. 4, the cover 43, the transport conduit 18, and the pressurized blower conduit 24 are formed as a unified, integrated structure.

In using the lawnmower blower apparatus 10 of the invention. A container 40 is secured into the container-support bracket 45. The container 40 can be empty or can have an empty disposal bag in it. When the engine 14 is turned on, the impeller 30 of the blower assembly 16 is turned as the output shaft 34 of the engine 14 rotates. The impeller 30 sucks air in through the air inlets 33 of the blower housing 32 and blows pressurized air into the pressurized blower conduit 24. The pressurized air enters the transport conduit 18 at the intermediate position 19, and a suction is created in the transport conduit 18 between the intermediate position 19 and the cutting blade housing 15. As lawn is cut, cuttings are sucked into the transport conduit 18, are lifted up the transport conduit 18 to the intermediate position 19, and are blown from the intermediate position 19 to the container 40 by the pressurized air from the pressurized blower conduit 24. It is further noted that the rotation of the cutting blades (not shown) can also generate some positively pressurized air to push cuttings up the transport conduit 18 to the intermediate position 19 where positively pressurized air is greatly increased from the pressurized blower conduit 24. The blown cuttings arrive at the cover 43 of the top loading container assembly and drop into the container 40 by the force of gravity. When the container 40 is sufficiently full, the engine 14 can be shut off, the cover 43 is removed, and the container 40 can be removed from the container-support bracket 45 to dispose of the accumulated cuttings. Then, the container 40 is replaced in the container-support bracket 45, and the cover 43 is replaced. This procedure can be repeated until the lawn is fully cut.

The components of the lawnmower blower apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved lawnmower blower apparatus that is low in cost, relatively simple in design and operation, and which may advantageously be used without depending upon lifting pressure developed in a cutting blade housing for transporting cuttings to a collection container. With the invention, a lawnmower blower apparatus is provided which has a blower and blower housing which are not contained in a cutting blade housing. With the invention, a lawnmower blower apparatus is provided which has a collection opening that is oriented vertically above the bottom of a collection container. With the invention, a lawnmower blower apparatus provides a blower that has an input air supply that is free of lawn cuttings. With the invention, a lawnmower blower apparatus is provided which pulls lawn cuttings from the cutting blade housing.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An apparatus comprising:

a lawnmower, the lawnmower including a cutting blade housing and an engine mounted to the cutting blade housing, the engine having a crankshaft with first and second ends, the first end of the crankshaft projecting below the cutting blade housing and the second end of the crankshaft projecting above the cutting blade housing, with a cutting blade mechanically coupled with the first end of the crankshaft, and a blower assembly including an impeller coupled to the second end of the crankshaft, the impeller operating to draw air over the engine to cool the engine during operation;

a transport conduit having a transport-conduit input end and a transport-conduit output end, the transport-conduit input end being connected to the cutting blade housing and positioned in communication with an area below the cutting blade housing;

a pressurized blower conduit having a blower-conduit input end and a blower-conduit output end, the blower-conduit input end being connected to the blower assembly, the blower-conduit output end being connected to the transport conduit at an intermediate position between the transport-conduit input end and the transport-conduit output end above the cutting blade housing;

a top loading container assembly supported by the lawnmower, the top loading container assembly being connected to the transport-conduit output end.

2. The apparatus of claim 1, wherein the top loading container assembly includes:

a container;

a container-support bracket which supports the container;

fasteners for connecting the container-support bracket to the lawnmower;

a cover assembly supported by the container.

3. The apparatus of claim 2, wherein the cover assembly includes:

a cover;

a conduit connector portion connected to the cover, wherein the conduit connector portion is connected to the transport-conduit output end;

a vent portion connected to the cover.

4. The apparatus of claim 3, wherein the cover, the transport conduit, and the pressurized blower conduit are formed as a unified, integrated structure.

* * * * *